July 14, 1942.   D. N. HUGHES   2,290,052
CONTROL VALVE
Filed March 2, 1940   4 Sheets-Sheet 2
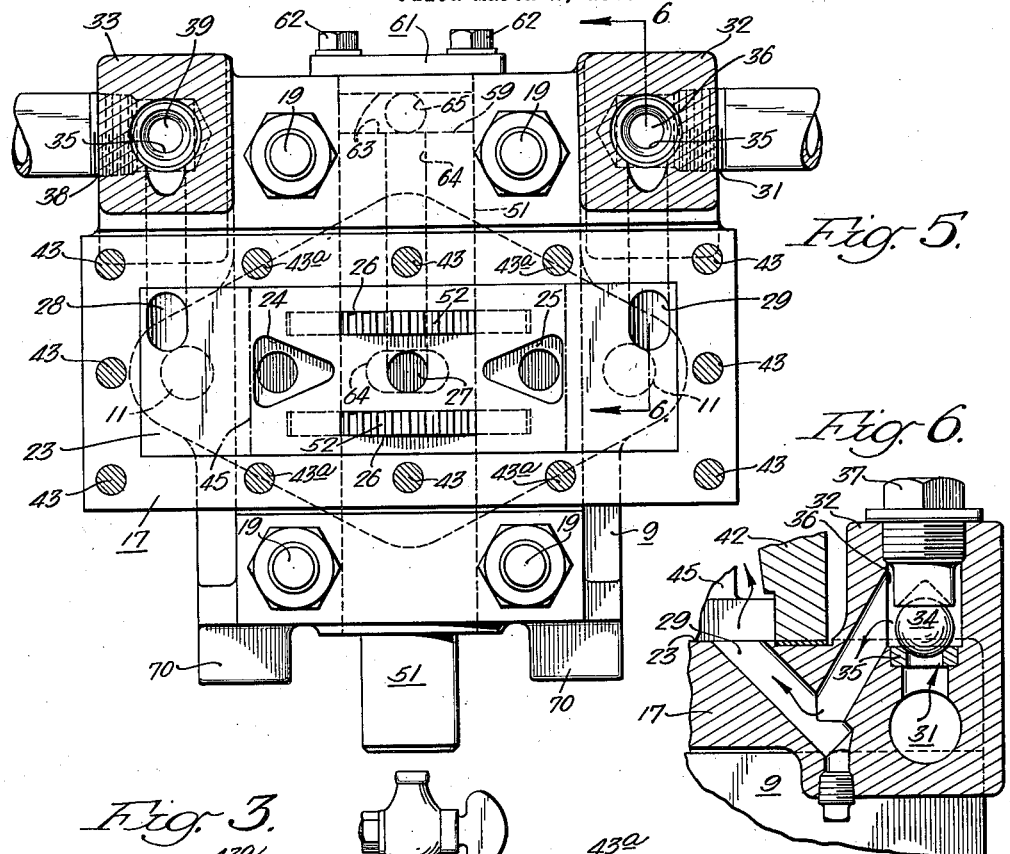
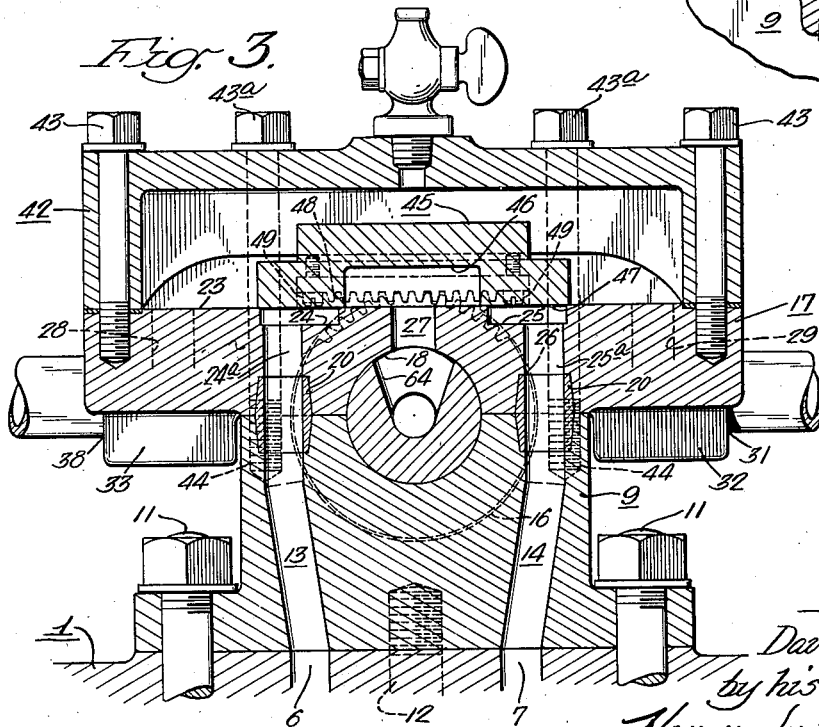
Inventor:
David N Hughes
by his Attorneys
Howson & Howson

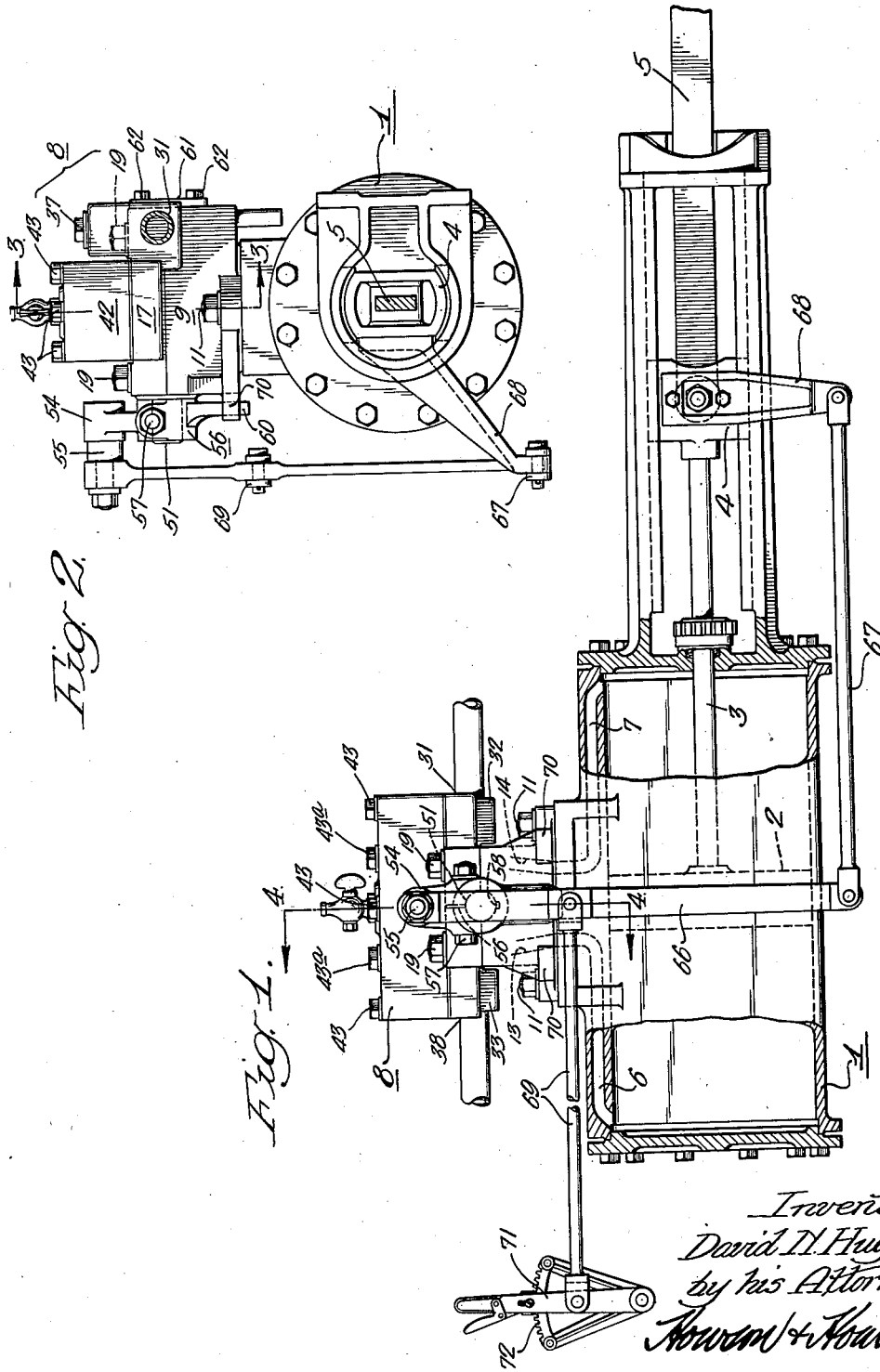

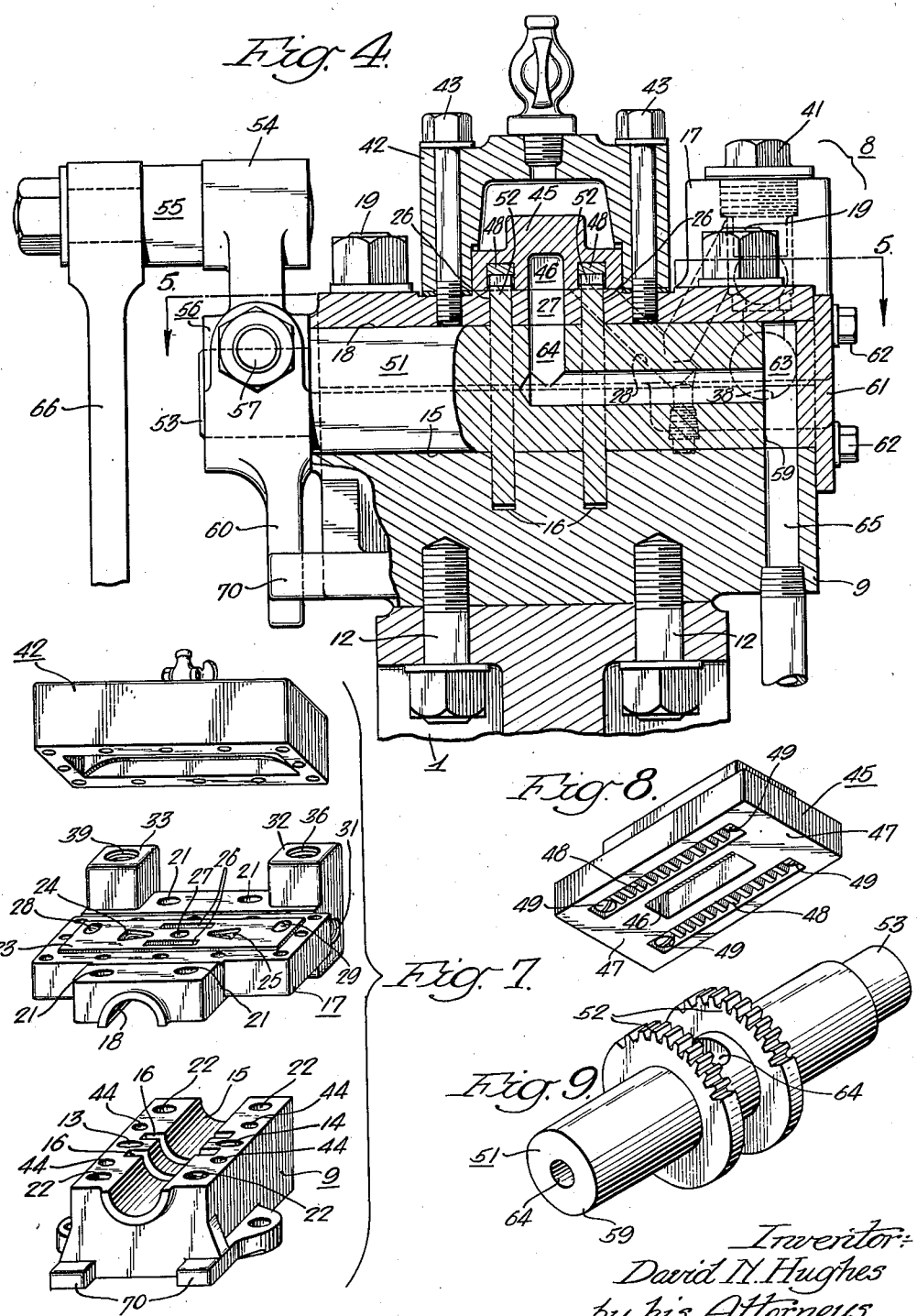

July 14, 1942.  D. N. HUGHES  2,290,052
CONTROL VALVE
Filed March 2, 1940  4 Sheets-Sheet 4
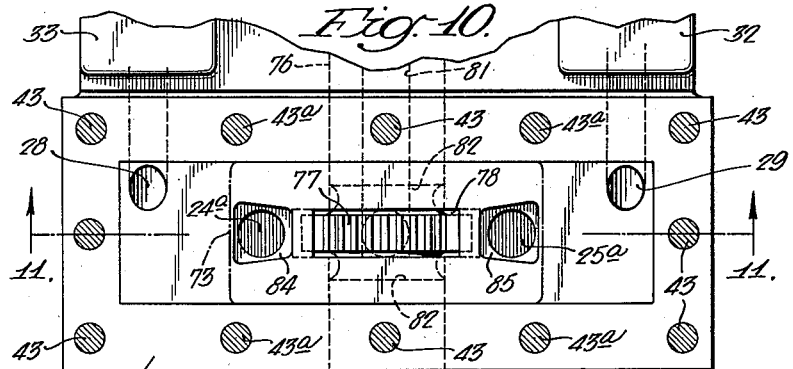
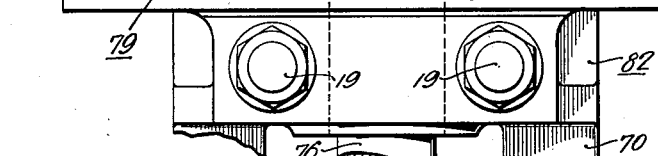
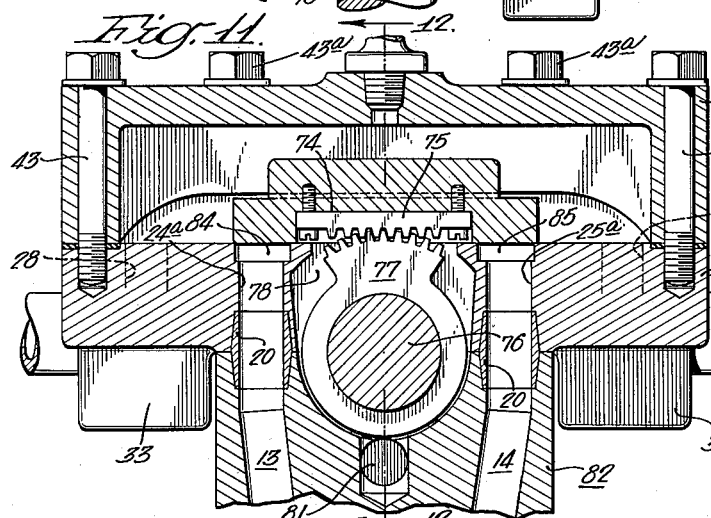
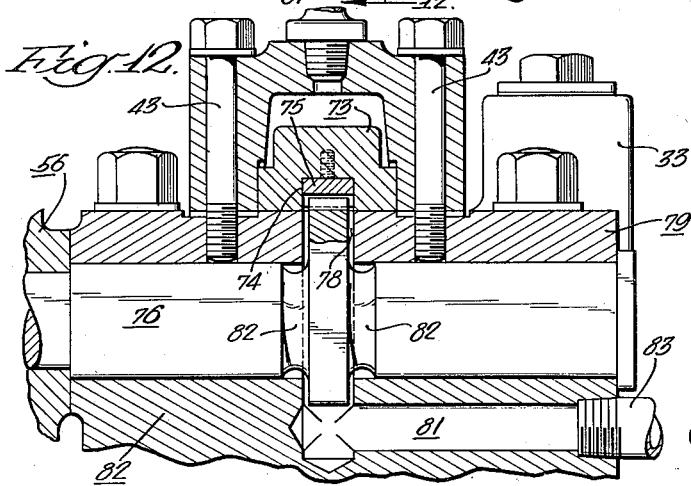
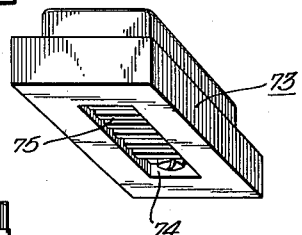
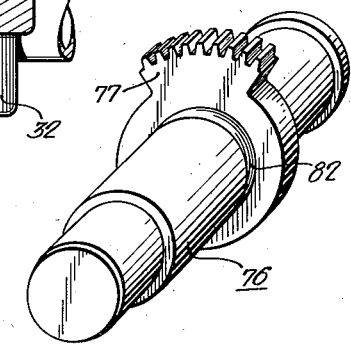
Inventor:
David N. Hughes
by his Attorneys Patented July 14, 1942

2,290,052

UNITED STATES PATENT OFFICE 2,290,052

CONTROL VALVE

David N. Hughes, Swarthmore, Pa.

Application March 2, 1940, Serial No. 322,002

3 Claims. (Cl. 121—46.5)

This invention relates particularly to improvements in control valves for power reverse mechanisms of steam, air, liquid, gaseous vapor locomotive engines and prime movers, and the principal object of the invention is to provide a control valve that shall be simple in form, positive and precise in operation, extremely easy to manipulate, substantially leakproof and readily maintainable in perfect operating condition.

More specifically, an object of the invention is to provide a thoroughly balanced and efficient control valve or mechanism of the slide type having novel and improved actuating means, as hereinafter fully described.

The invention resides further in certain novel structural and mechanical features hereinafter set forth, and illustrated in the attached drawings, wherein:

Figure 1 is a side elevational and partial sectional view illustrating a control valve made in accordance with the invention;

Fig. 2 is an end elevational view of the assembly shown in Fig. 1;

Fig. 3 is a section on the line 3—3, Fig. 2;

Fig. 4 is a section on the line 4—4, Fig. 1;

Fig. 5 is a section on the line 5—5, Fig. 4;

Fig. 6 is a section on the line 6—6, Fig. 5;

Fig. 7 is an exploded view showing in perspective the three principal elements of the valve casing;

Fig. 8 is a view in perspective of the sliding valve element;

Fig. 9 is a view in perspective of the valve-actuating shaft and gears;

Fig. 10 is a fragmentary plan view similar to that shown in Fig. 5 llustrating a modification within the scope of the invention;

Fig. 11 is a fragmentary sectional view on the line 11—11, Fig. 10;

Fig. 12 is a transverse sectional view on the line 12—12, Fig. 11, and

Figs. 13 and 14 are, respectively, views in perspective of the sliding valve element and of the valve-actuating shaft and gear shown in the immediately preceding figures.

With reference particularly to Figs. 1 and 2 of the drawings, the reference numeral 1 designates a cylinder containing a piston 2 which in the present instance is adapted to be connected through a piston rod 3, cross head 4 and link rod 5 with an engine valve gear (not shown). Pressure fluid is admitted to the cylinder 1 at opposite sides of the piston 2 through ports 6 and 7, and these ports also function as exhaust ports, as hereinafter set forth.

Secured to the top of the cylinder 1 is a control valve designated generally by the reference numeral 8. The housing for this valve comprises a base member 9 which is secured to the cylinder by stud bolts 11, 11 and 12, 12, see Figs. 3 and 4, and this base member contains two ports 13 and 14 which extend through the base from top to bottom and register respectively with the ports 6 and 7 of the cylinder 1. At the top of the base member 9 is a semi-cylindrical longitudinal recess 15 which forms the lower half of a shaft bearing, and this recess is intersected by two relatively spaced parallel slots 16, 16.

The valve casing further comprises an upper section 17, the under side of which is formed with a semi-cylindrical recess 18 which in assembly registers with the recess 15 of the base member 9 and constitutes the upper and supplemental part of the shaft bearing. The member 17 is secured to the base member 9 by means of screws 19 which extend downwardly through holes 21 in the member 17 and are threaded into tapped holes 22 in the base member, see Figs. 5 and 7. At the upper side of the member 17 and extending transversely of the recess 18 and above the latter is a valve seat 23, and formed in this seat are two triangularly shaped ports 24 and 25 which in assembly and by way of passages 24a and 25a communicate with the ports 13 and 14 respectively of the base member. The joints between the passages 24a and 25a and the respective ports 13 and 14 are preferably sealed through the medium of double tapered thimbles 20, 20, as shown in Fig. 3. The surface of the seat 23 is also intersected by two slots 26, 26 which extend to the under side of the member 17 and which at the under side register with the slots 16, 16 of the base member.

Intermediate the slots 26, 26 is a port 27 which extends downwardly from the seat 23 to the top of the bearing recess 18. At opposite ends of the seat are two ports 28 and 29. The port 29 is extended through the member 17, as shown in Fig. 6, for communication with a port 31 which enters the member 17 at the side of one of two upstanding lugs 32 and 33. Also as shown in Fig. 6, the connection between the ports 29 and 31 is controlled by a check valve 34 in the form in the present instance of a sphere which normally seats upon a collar 35 set into the boss 32 above the port 31. This check valve permits passage of fluid from the port 31 to the port 29, but prevents passage of fluid between the ports in the opposite direction. An opening 36 in the top of the boss 32 provides for installation of the collar 35 and the ball valve 34, and this opening 36 is normally closed by a screw plug 37. The port 28 is similarly connected to a port 38 at one side of the boss 33, and the connection between the ports 28 and 38 is controlled by a check valve corresponding to the valve 34, which while permitting passage of fluid from the port 38 to the port 28 prevents passage of fluid in the reverse direction. The boss 33 has an opening 39 at the top thereof which corresponds to the opening 36 of the lug 32 and which has a corresponding function, and this opening 39 is normally closed by a screw plug 41, as shown in Fig. 4.

The third major portion of the valve case consists of a cover member or cap 42 which overlies and encloses the seat 23 and forms the valve chamber. The member 42 is secured to the member 17 by means of screws 43. Four of the screws, 43a, extend completely through the member 17 and are threaded into tapped holes 44 in the base member 9, as shown in Figs. 3 and 5.

The sliding valve member 45, as shown in Figs. 3, 4, 5 and 8, is of more or less conventional form. The valve member rests flatly upon the seat 23 and in operation slides longitudinally of the latter, the said member being closely confined laterally and being guided between the side walls of the cap 42, as illustrated in Fig. 4. In its seating face, the valve member has a longitudinally extending recess 46 which immediately overlies and registers with the port 27 in the seat 23. At each end of the recess 46 is a solid portion 47 which when the valve element is centrally positioned on the seat 23 overlie and close the respective ports 24 and 25.

Set into the seating face of the valve member at opposite sides respectively of the recess 46 are two longitudinally extending parallel racks 48 which respectively directly overlie the slots 26, 26 of the casing member 17, as best shown in Fig. 4. The racks in the present instance are secured to the valve member by screws 49, and alternatively the racks might be welded, pinned or otherwise secured to the valve member, or be milled from the material of said member so as to constitute an integral part of the latter. In assembly, a rock shaft 51 is journaled in the bearing 15—18, formed as previously described between the base member 9 and the member 17 of the casing, and this shaft carries two spur gear elements 52, 52 which extend into the slots 16, 16 of the base member and upwardly through the slots 26, 26 of the member 17 to mesh with the racks 48, 48 of the slide valve member. The gear elements 52 may be formed as integral parts of the shaft 51.

One end 53 of the shaft projects beyond the end of the casing and has secured thereto an arm 54 which carries at its outer end a crank pin 55. In the present instance the arm 54 comprises a split collar, as indicated at 56 in Fig. 1, and this collar is clamped solidly on the terminal end 53 of the shaft by a bolt 57. The collar may also be keyed to the shaft, as indicated at 58. The opposite end 59 of the shaft terminates short of the end of the journal 15—18, as shown in Fig. 4, and the adjacent end of the said journal is closed by means of a cap plate 61 which is secured to the casing by screws 62. The space 63 between the terminal end 59 of the shaft and the inner face of the cover plate 61 is in communication with the port 27 through the medium of a passage 64 formed in the shaft; and the space or chamber 63 also communicates with a port 65 which extends downwardly through the base member 9. As hereinafter set forth, the passage 64, chamber 63 and port 65 provide an exhaust passage which is in continuous communication with the recess 46 of the valve element.

Attached to the crank pin 55 of the arm 54 is a lever 66, this lever extending downwardly and being pivotally connected at its lower end to a rod 67, the other end of this rod being pivotally connected to an arm 68 rigidly attached to the cross head 4. Intermediate its ends, the lever 66 has pivotally connected thereto an operating rod 69. This rod in turn is pivotally connected to a lever 71 which is operatively associated in the usual manner with a toothed quadrant 72.

In the drawings, the various moving parts of the device, including the valve element 45 and the quadrant lever 71, are shown in the intermediate or neutral positions. If the lever 71 is moved in either direction from this position, the lever 66 will be moved around its pivotal connection with the rod 67, and will correspondingly move the arm 54 connected to the shaft 53. Rotary movement of the shaft acting through the gear elements 52 and the racks 48 will shift the valve 45 from the intermediate position uncovering the ports 24 and 25, one of these ports being then in communication with the valve recess 46 and the other with the valve chamber formed within the cap 42. One end of the cylinder 1 will thus be connected through the valve recess 46 and port 27 with the exhaust passage 64—63—65, while the other end of the cylinder will be connected through the valve chamber and either of the ports 28 or 29 with a source of fluid pressure connected to the associated ports 38 and 31. Normally one of the ports 38 and 31 will be connected to a steam pressure line and the other to a source of compressed air. The resulting movement of the piston 2 and of the cross head 4 will effect a pivotal movement of the lever 66 about the point of pivotal connection of this lever with the rod 69, with the result that the shaft 51 will be rotated in a direction opposite to that in which the original rotation occurred, the valve element 45 thereby being returned to its original neutral position in which both of the ports 24 and 25 are closed, as shown in Fig. 3. The extent of movement of the piston 2 is thus correlated with the original movement of the quadrant lever 71 and may be accurately controlled through the last-named lever. It will be noted that oscillation of the shaft 51 is limited by stops 70, 70 on the base member 9 which lie at opposite sides of the lower extended end 60 of the arm 54.

In the aforedescribed device, the gear and rack transmission insures a positive and precise movement of the valve member. By reason of the relative arrangement of the racks in the valve member, the thrusts imposed through the gears are entirely balanced, and the valve member itself is uniformly and firmly seated by the equal distribution of pressures in the valve chest. The triangular ports 24 and 25 afford a quick admission and a slow release of pressures to and from the cylinder, and steam chest valve shock is thereby eliminated. Leaking and creeping of the reverse gear is entirely eliminated, and the valve may be readily inspected and maintained in proper working condition by simple removal of the cover 42 from the casing member 17.

In Figs. 10 to 14, inclusive, I have illustrated a modification wherein a single rack and gear are employed instead of two shown in the previously described embodiment. In this case, the seating face of the sliding valve element 73 is centrally recessed at 74 for reception of a single rack 75, it being noted that this rack is somewhat wider than the racks 52 previously described. The operating shaft 76 is provided with a single segmental gear 77 which extends upwardly through a slotted chamber 78 in the upper casing section 79, which corresponds to the casing section 17 of the previously described embodiment, into meshing engagement with the rack 75. The chamber 78 is somewhat wider than the axial thickness of the gear 77, and at the bottom communicates with a port 81 which extends through the casing base member 82 for connection at its outer end with an exhaust pipe 83. With this arrangement, the recess 74 of the valve element 73 is in direct communication with the port 81, and preferably the shaft 76 is circumferentially grooved at the opposite sides of the gear 77, as indicated at 82, in order to facilitate passage of the exhaust fluid through the chamber 78 to the port 81.

At opposite sides of the chamber 78 are ports 84 and 85 which correspond to the ports 24 and 25 of the previously described embodiment, and preferably the valve element 73 when in the normal central position will cover and close the ports 84 and 85. It is apparent that if the valve element is shifted from this central position in either direction, one of the ports 84 or 85 will be thrown into communication through the recess 74 of the valve element and the chamber 78 with the exhaust port 81, the other of the ports 84—85 being opened to the valve chamber.

In all other essential respects, the device illustrated in Figs. 10 to 14, inclusive, corresponds to the previously described embodiment; and it will be understood that as to either embodiment, the valve element may be formed so as to provide a lead in accordance with the conventional practice.

It is apparent that whereas the invention as herein described is directed primarily to the provision of a relatively simple and highly efficient form of power reverse gear control valve, the principle of the invention may find useful application in valves employed for other purposes. The invention, therefore, is not limited to the specifically illustrated embodiment; and it is apparent further that there may be still further modification in the structural form of the device without departure from the invention as defined in the appended claims.

I claim:

1. A casing having a valve chamber, a valve member movably mounted in said chamber, a wall of said chamber forming a seat for the valve member, and said wall having ports controlled by said valve member and a slot extending longitudinally of said seat, a rack on the valve member in alignment with said slot, a shaft journaled in the casing, a gear element on the shaft extending into said slot and meshing with the rack, and a port in said shaft registering with and forming a continuation of one of the said ports controlled by the valve member.

2. A casing having a valve chamber, a valve member movably mounted in said chamber, a wall of said chamber forming a seat for the valve member, and said wall having ports controlled by said valve member and a slot extending longitudinally of said seat, a rack on the valve member in alignment with said slot, a shaft journaled in the casing, a gear element on the shaft extending into said slot and meshing with the rack, a chamber in said casing at one end of the shaft and a port in the casing communicating with said chamber, a longitudinal passage in the shaft communicating at one end with the last-named casing chamber and at the other end with a port in the periphery of the shaft, and said port being arranged to register with one of the said ports controlled by the valve member.

3. A valve comprising upper and lower separable casing sections, a valve chamber in said upper section, a valve member movable in said chamber, the bottom wall of the chamber forming a seat for said valve and having ports controlled by said valve, a bearing formed in and between said casing sections and extending transversely of and below said seat, one of said ports extending downwardly to the top of said bearing, and others of said ports extending downwardly at opposite sides respectively of said bearing, slots in said upper and lower sections transversely intersecting said bearing in spaced relation to the port first named and intersecting the valve seat, a shaft in said bearing having a port communicating with said first-named port, gear means carried by said shaft and projecting into said slots, and rack means on the valve member meshing with said gear means.

DAVID N. HUGHES.